US011897736B2

(12) United States Patent
Uderhardt

(10) Patent No.: US 11,897,736 B2
(45) Date of Patent: Feb. 13, 2024

(54) HYDRAULIC ACTUATOR FOR A LOCKING DEVICE OF A TELESCOPIC BOOM, LOCKING DEVICE, TELESCOPIC BOOM, MOBILE CRANE, AND METHOD FOR ADJUSTING A TELESCOPIC BOOM

(71) Applicant: TADANO FAUN GmbH, Lauf a. d. Pegnitz (DE)

(72) Inventor: Detlef Uderhardt, Lauf an der Pegnitz (DE)

(73) Assignee: TADANO FAUN GmbH, Lauf a. d. Pegnitz (DE)

(*) Notice: Subject to any disclaimer, the term of this patent is extended or adjusted under 35 U.S.C. 154(b) by 112 days.

(21) Appl. No.: 17/720,504

(22) Filed: Apr. 14, 2022

(65) Prior Publication Data

US 2022/0332552 A1 Oct. 20, 2022

(30) Foreign Application Priority Data

Apr. 14, 2021 (DE) ..................... 10 2021 203 701.1

(51) Int. Cl.
*B66C 23/70* (2006.01)
*B66C 23/00* (2006.01)
*F15B 15/08* (2006.01)

(52) U.S. Cl.
CPC ............ *B66C 23/708* (2013.01); *B66C 23/54* (2013.01); *B66C 23/705* (2013.01); *F15B 15/088* (2013.01); *B66C 2700/0371* (2013.01)

(58) Field of Classification Search
CPC ................ F15B 15/088; F15B 15/1409; F15B 2015/268; F15B 15/26; B66C 23/705; B66C 23/708; B66C 23/54
See application file for complete search history.

(56) References Cited

U.S. PATENT DOCUMENTS 4,036,372 A * 7/1977 Rao ....................... B66C 23/705 212/292
10,322,915 B2 6/2019 Kaupert et al.
(Continued)

FOREIGN PATENT DOCUMENTS

CN 102730578 A * 10/2012 ........... B66C 23/708
DE 102013212560 A1 * 12/2014 ........... F01D 17/145
(Continued)

OTHER PUBLICATIONS

CN 102730578 A Machine Translation. (Year: 2012).*
(Continued)

*Primary Examiner* — Michael R Mansen
*Assistant Examiner* — Juan J Campos, Jr.
(74) *Attorney, Agent, or Firm* — Laurence A. Greenberg; Werner H. Stemer; Ralph E. Locher

(57) ABSTRACT

A hydraulic actuator for a mobile crane, in particular for a locking device of a telescoping device. The hydraulic actuator has a double chamber cylinder with a first cylinder chamber and a second cylinder chamber oriented in an opposite direction to the first cylinder chamber, a first piston rod for the first cylinder chamber, and a second piston rod for the second cylinder chamber. A first restoring spring restores the first piston rod to its main position and a second restoring spring restores the second piston rod to its main position. The main position of the first piston rod is its pushed-in position and the main position of the second piston rod is its extended position.

12 Claims, 5 Drawing Sheets

(56) References Cited

U.S. PATENT DOCUMENTS

| | | | | |
|---|---|---|---|---|
| 2015/0041422 A1* | 2/2015 | Kaupert | B66C 23/708 212/292 |
| 2015/0128735 A1* | 5/2015 | Klein | F16H 21/44 74/110 |
| 2020/0010181 A1* | 1/2020 | Lindahl | B64C 25/50 |

FOREIGN PATENT DOCUMENTS

| | | | | |
|---|---|---|---|---|
| DE | 102014215367 B3 * | 8/2015 | F03B 13/264 |
| DE | 202014006620 U1 * | 12/2015 | F04B 3/00 |
| EP | 1350960 A1 * | 10/2003 | B25J 15/0253 |
| EP | 2835336 B1 | 2/2018 | |
| FR | 2526883 A1 * | 11/1983 | F15B 15/1409 |

OTHER PUBLICATIONS

FR 2526883 A1 Machine Translation. (Year: 1983).*
EP 1350960 A1 Machine Translation (Year: 2003).*
DE 102013212560 A1 Machine Translation (Year: 2014).*
DE 102014215367 B3 Machine Translation (Year: 2015).*
DE 202014006620 U1 Machine Translation (Year: 2015).*

* cited by examiner

HYDRAULIC ACTUATOR FOR A LOCKING DEVICE OF A TELESCOPIC BOOM, LOCKING DEVICE, TELESCOPIC BOOM, MOBILE CRANE, AND METHOD FOR ADJUSTING A TELESCOPIC BOOM

CROSS-REFERENCE TO RELATED APPLICATION

This application claims the priority, under 35 U.S.C. § 119, of German Patent Application DE 10 2021 203 701.1, filed Apr. 14, 2021; the prior application is herewith incorporated by reference in its entirety.

FIELD AND BACKGROUND OF THE INVENTION

The invention relates to a hydraulic actuator for a locking device of a telescopic boom, in particular a telescopic boom for a mobile crane. In addition, the invention also relates to such a locking device. The invention furthermore also relates to such a telescopic boom. In addition, the invention relates to a mobile crane having such a telescopic boom. The invention furthermore also relates to a method for adjusting such a telescopic boom.

A telescopic boom is conventionally a length-adjustable (mobile) crane assembly which is conventionally pivotable about a vertical axis and/or transverse axis and which is consequently generally used for lifting, in particular for moving loads. Telescopic booms of this type are customarily formed by a plurality of (i.e., at least two) boom segments which are arranged displaceably one inside another. Said boom segments are locked to one another in their respective actuating positions with respect to one another, at least in an extended actuating position, generally also in a retracted actuating position, such that no actuating force for maintaining said actuating position is required. In order to lock the boom segments to one another, a "locking bolt" is customarily brought into engagement in a form-fitting manner with the two boom segments transversely with respect to the longitudinal extent of the two boom segments. Said locking bolts are conventionally arranged displaceably on the inner instance of the two boom segments.

For the length adjustment of the boom segments with respect to one another, the telescopic boom generally comprises a hydraulic cylinder which is arranged in the interior of the two boom segments or of all of the boom segments. Said hydraulic cylinder is coupled in a form-fitting manner to the corresponding boom segment for the purpose of telescoping same and, with a locking device arranged on the hydraulic cylinder, unlocks the locking bolt (or conventionally two locking bolts arranged on opposite longitudinal sides of the boom segment) such that the respective boom segment can be displaced in relation to the surrounding boom segment. Subsequently, the hydraulic cylinder moves in the longitudinal direction and, as it does so, carries along the boom segment to be displaced.

For the form-fitting coupling to the respective boom segment, the hydraulic cylinder conventionally has driver bolts which are displaceable in the transverse direction and which are located in corresponding receptacles of the respective boom segment during the telescoping operation. Expediently, the driver bolts here are arranged in a region (portion) of the hydraulic cylinder at which the locking device for locking and unlocking the locking bolts is also arranged. This region of the hydraulic cylinder is also referred to as a "locking head."

The driver bolts and the locking device are conventionally actuated hydraulically. The locking device has drivers which are generally arranged displaceably in the transverse direction with respect to the hydraulic cylinder and which, in a coupling position of the hydraulic cylinder as intended with respect to the boom segment to be telescoped, are in engagement with the respective locking bolt and are therefore coupled in terms of force transmission. The locking head of the hydraulic cylinder, therefore has to contain an actuator, in particular a hydraulic actuating device for the driver bolts and for the drivers for locking and unlocking the locking bolts.

SUMMARY OF THE INVENTION

The invention is based on the object of improving the locking and unlocking of boom segments of a telescopic boom.

With the above and other objects in view there is provided, in accordance with the invention, a hydraulic actuator for a mobile crane, the hydraulic actuator comprising:

- a double chamber cylinder formed with a first cylinder chamber and a second cylinder chamber oriented opposite said first cylinder chamber;
- a first piston rod associated with said first cylinder chamber and a second piston rod associated with said second cylinder chamber;
- a first restoring spring configured for restoring said first piston rod to a main position thereof wherein said first piston rod is in a pushed-in position in said first cylinder chamber; and
- a second restoring spring configured for restoring said second piston rod into a main position thereof wherein said second piston rod is in an extended position.

With the above and other objects in view there is also provided, in accordance with the invention, a locking device for a telescopic boom, comprising:

- the hydraulic actuator as outlined above for generating an actuating force;
- a locking bolt secured at a boom extension segment of the telescopic boom;
- at least one driver configured to be reversibly coupled, during a telescoping movement of the telescopic boom, to said locking bolt, and to be moved by the actuating force for adjusting said locking bolt between a locking position and a release position;
- at least one driver bolt configured to be reversibly moved by the actuating force between a carry-along position, gripping an inner boom extension segment, and an empty running position in which no boom extension segment is gripped; and
- a slotted actuating link configured for a joint movement of said locking bolt and said driver bolt, said slotted actuating link, in an installation state as intended, having a movement plane oriented perpendicular to a telescoping direction of the telescopic boom.

In other words, the hydraulic actuator according to the invention ("actuator" for short) is configured and provided for use on a mobile crane, in particular within the scope of a locking device of a telescoping device of the mobile crane. For this purpose, the actuator has a double chamber cylinder with a first cylinder chamber and a second cylinder chamber oriented in an opposed manner with respect thereto. Corresponding thereto, the actuator has a first piston rod for the first cylinder chamber and a second piston rod for the second cylinder chamber. As is customary for a hydraulic cylinder, said piston rods are mounted displaceably in the cylinder, specifically in the corresponding cylinder chamber. The actuator also has a first restoring spring for restoring the first piston rod to its main position and a second restoring spring for restoring the second piston rod to its main position. The main position of the first piston rod is arranged in the pushed-in position thereof and the main position of the second piston rod is arranged in the extended position thereof.

Consequently, the double chamber cylinder can therefore preferably take up a general main position (i.e., encompassing the double chamber cylinder) (also referred to as "neutral position") by means of the pushed-in first piston rod and the simultaneously extended second piston rod. As a result, the actuator can be moved into a first operating position, in which the two piston rods are extended, and into a second operating position, in which the two piston rods are pushed in, by active pressurization of only one of the two cylinder chambers. The general main position is therefore advantageously a central position, as seen with respect to the length of the double chamber cylinder. By this means, actuating operations in which an actuating member needs to be adjusted in two opposed directions from a neutral position can therefore be undertaken in a simple manner. This is the case in particular for a locking device for a telescoping cylinder serving as telescoping device (the locking device is frequently also referred to as "locking head" in this case) of a mobile crane. Here, for carrying along a boom segment (also: "boom extension segment"), which is mounted in a sliding manner in a further boom segment, the telescoping cylinder is generally coupled to the former, in particular "is bolted" thereto by means of what are referred to as driver bolts. Locking bolts that said boom segment to be carried along bears for locking to the outer boom segment have to be released ("unlocked" or "unbolted"), however, for adjustment (i.e., for the "telescoping"). By means of the actuator described here and below, advantageously an actuating member, in particular a slotted actuating link, of the locking device, which actuating member acts in particular both on the locking bolt and on the driver bolt, can now be adjusted. Further drives, for example a second cylinder, are not required in this case. The actuator according to the invention therefore permits a compact and uncomplicated design of crane elements, in particular of the telescoping device of a mobile crane. In comparison to classic double-action cylinders, in the case of the double chamber cylinder of the actuator according to the invention, the respective main position of the two piston rods and therefore also the general main position can, however, be predetermined comparatively simply, in particular since the two piston rods can be adjusted toward their corresponding end stops.

The actuator preferably has a controller (also referred to as control unit or control device) which is intended, during operation of the telescopic boom of the mobile cranes as intended, to distribute hydraulic pressure to the first and to the second cylinder chamber, in particular independently of one other and preferably at different times. In particular, the assignment of hydraulic pressure to one of the two cylinder chambers comprises relieving the other cylinder chambers of pressure or switching them to an unpressurized state. This is accomplished by connecting the controller to actuating valves of a hydraulic system for control purposes.

In particular, the hydraulic system, at least the line system thereof, preferably with actuating valves contained therein, is part of the actuator. For the expedient situation in which the telescoping device, which is designed for applying the force required for telescoping the respective boom extension segment, is formed by a hydraulic cylinder (in particular the above-described "telescoping cylinder", also referred to as "telescope cylinder" for short), the hydraulic system, in the use state as intended, is preferably coupled to the hydraulic volume of the telescope cylinder such that hydraulic pressure is removed from the telescope cylinder in order to operate the double chamber cylinder. As a result, separate feed lines to the actuator can advantageously be omitted.

In an expedient embodiment, the first restoring spring is arranged in a spring cage which is coupled rigidly to the double chamber cylinder. In addition, the first restoring spring is supported in the spring cage against a spring plate arranged on the push-in side of the first piston rod. As a result, support of the first restoring spring, which support is independent of the installation situation of the double chamber cylinder, in the push-in direction of the first piston rod is achieved. The spring cage here is formed in particular by a (further) spring plate (in particular arranged on the extension side with respect to the first piston rod) and a linkage coupling said spring plate to the double chamber cylinder. The linkage is expediently a number of threaded rods, preferably three, which each form a supporting column and by means of which the spring plate of the spring cage can be adjusted in terms of its position relative to the double chamber cylinder, in particular can be adapted to the present installation situation and/or to the spring characteristic of the first restoring spring. Alternatively, the linkage is designed for unalterably holding the spring plate, for example by virtue of the spring plate being welded to corresponding rods of the linkage.

By contrast, the second restoring spring is preferably arranged, in particular braced, between the double chamber cylinder, optionally between a spring plate attached rigidly thereto and a spring plate arranged on the extension side of the second restoring spring.

In a preferred embodiment, the double chamber cylinder and the two piston rods are configured in such a manner that the first piston rod is moved by hydraulic pressure in an extension direction and that the second piston rod is moved by hydraulic pressure in a push-in direction. In particular, for this purpose, a hydraulic inlet (or hydraulic connection) for hydraulic fluid into the second cylinder chamber is arranged in the vicinity of or at an extension-side longitudinal end of the second cylinder chamber such that the hydraulic fluid is always present on an extension-side piston surface of the piston carried by the second piston rod. Correspondingly conversely, a hydraulic inlet into the first cylinder chamber is arranged at the push-in-side longitudinal end of the first cylinder chamber.

In a further preferred embodiment, the first piston rod, as assigned first piston, bears a plunger piston (protruding radially over the first piston rod). Said plunger piston has (longitudinal) grooves such that the hydraulic fluid can wash around them. As a result, the effective area of the first piston is indeed reduced. Nevertheless, such a plunger piston has better mechanical efficiency than a classic piston. In addition, said plunger piston also serves as end stop and therefore as mechanical securing for the first piston rod in the extension direction.

In an expedient embodiment, the second cylinder chamber is connected on the piston inner side to a venting valve, in particular is coupled to the environment by means of said venting valve. As a result, a negative pressure or positive pressure during the adjustment of the piston of the second piston rod in the fluid-free part of the second cylinder chamber is avoided, which would otherwise lead to a loss of action.

As already mentioned above, in a preferred embodiment, the first and the second cylinder chamber can be charged with hydraulic pressure independently of one other. In particular, the hydraulic pressure "is allocated" by means of the controller of the respective cylinder chamber, in particular by appropriate switching of control valves.

The locking device according to the invention is, as described above, configured and provided for use in a telescopic boom, in particular of a mobile crane. For this purpose, the locking device has the above-described hydraulic actuator in order to generate an actuating force. In addition, the locking device has at least one driver, which is configured to be reversibly coupled, during the telescoping movement of the telescopic boom, to an associated locking bolt, which is secured at a boom extension segment of the telescopic boom, and to be moved under the action of the actuating force for adjusting the locking bolt between at least one locking position and a release position. The locking device furthermore also has at least one driver bolt which is configured to be moved reversibly under the action of the actuating force between a carry-along position gripping an inner boom extension segment and an empty running position not gripping a boom extension segment. In addition, the locking device has a slotted actuating link which is configured (preferably by means of a dedicated movement driven by the actuating force) for the joint movement of the locking bolt and of the driver bolt (in particular by transmission of the actuating force to said bolts). In the installation state as intended, a movement plane, preferably the sole movement plane, of the slotted actuating link is oriented perpendicularly to the telescoping direction of the telescopic boom.

Owing to the fact that the slotted actuating link has its movement plane oriented perpendicularly to the telescoping direction, the activation, in particular the transmission of movement to the driver and to the driver bolt, is simplified by means of just one element, namely the slotted actuating link.

The telescopic boom according to the invention serves for use on a mobile crane and has a number of boom segments, which are mounted displaceably in one another, a telescoping drive (in particular the above-described telescoping device) and the above-described locking device.

With the above and other objects in view there is also provided, in accordance with the invention, a mobile crane which includes the above-described telescopic boom.

The locking device according to the invention, the telescopic boom and the mobile crane therefore also have the actuator according to the invention and therefore share the advantages described within the scope thereof.

The method according to the invention is used for adjusting the above-described telescopic boom. According to the method, for the locking of an inner instance of the boom segments (or: boom extension segments) to the next outer boom segment (optionally also to the outermost boom segment, which is also referred to as "main segment"), the first cylinder chamber is charged with hydraulic pressure and the second cylinder chamber is switched to an unpressurized state. The driver bolt is decoupled from the inner boom segment—in particular because of the movement of the above-described slotted actuating link. For the unlocking of the inner boom segment from the next outer boom segment (or from the main segment), the first cylinder chamber, by contrast, is switched to an unpressurized state and the second cylinder chamber is charged with hydraulic pressure. In this case, in particular because of the resultant movement of the slotted actuating link, the locking bolt is decoupled from the next outer boom segment and the driver bolt is coupled to the inner boom segment.

The controller is preferably a microcontroller having a processor and a data memory in which the functionality for controlling the locking device, i.e., in particular the actuator, is implemented by programming in the form of operating software (firmware). Alternatively, however, the controller can also be a nonprogrammable electronic component, e.g., an ASIC, in which the functionality for control purposes is implemented using circuitry means. Furthermore, optionally in addition, purely electrical activation capability is also provided by virtue of—preferably the already existing—hydraulic valves being activatable directly (i.e., without interconnected logic), preferably by means of an (in particular manually actuable) switch incorporated in a corresponding control line. This serves preferably as an emergency controller if the electronic controller fails and provided that there is still a hydraulic supply.

Other features which are considered as characteristic for the invention are set forth in the appended claims.

Although the invention is illustrated and described herein as embodied in an hydraulic actuator for a locking device of a telescopic boom, a locking device, a telescopic boom, a mobile crane, and a method for adjusting a telescopic boom, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Parts corresponding to one another are provided with the same reference signs throughout the figures.

DETAILED DESCRIPTION OF THE INVENTION

Figure 1:
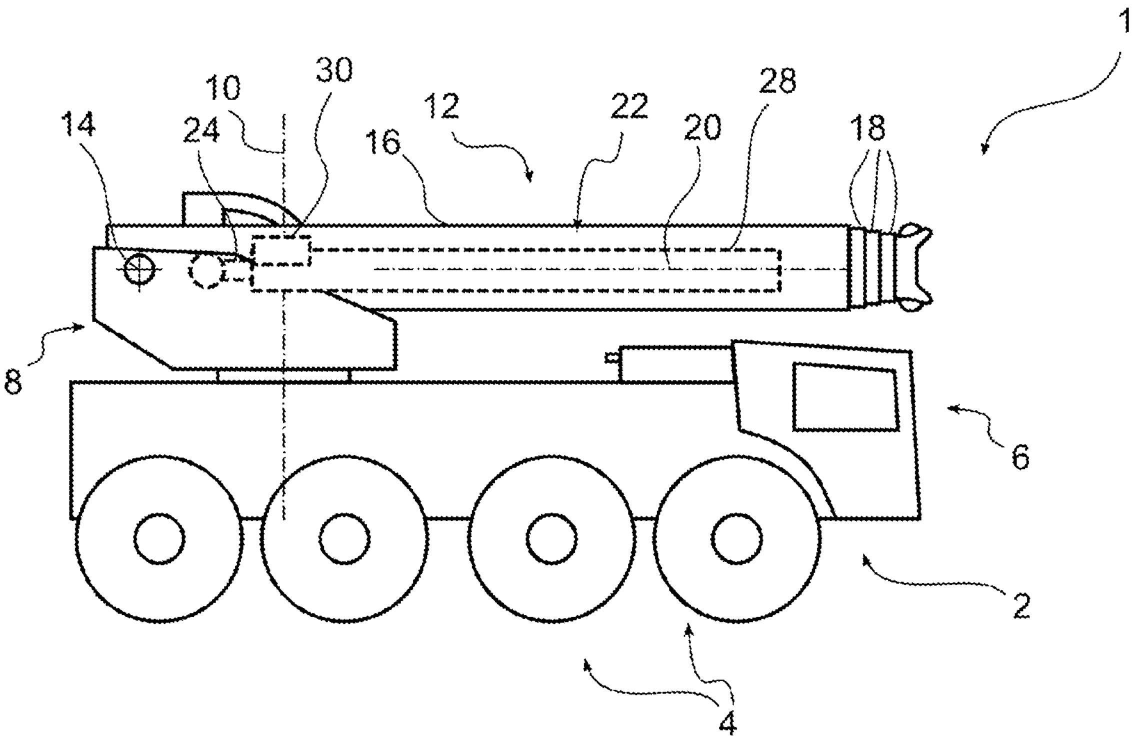
FIG. 1 is a schematic side view of a mobile crane with a telescopic boom and a telescoping device.

Referring now to the figures of the drawing in detail and first, in particular, to FIG. 1 thereof, there is shown a simple schematic illustration of a crane, specifically a mobile crane 1. The latter comprises an undercarriage 2 which, in turn, has a chassis with a plurality of driving axles carrying wheels 4, and a cockpit 6. The mobile crane 1 also comprises a superstructure 8 which is rotatably coupled to the undercarriage 2 about a vertical axis 10. In addition, the mobile crane 1 comprises a crane boom (also: "telescopic boom"; "boom 12" for short below) which forms part of the superstructure 8 and which is coupled to a mounting of the superstructure 8 so as to be pivotable about a rocker axis 14 ("tiltably", i.e., adjustably in terms of its inclination). The boom 12 is telescopic and, for this purpose, has a main segment 16 in which a plurality of further boom segments (also: "boom extension segments 18"), each reduced in size in cross section, are accommodated displaceably along a longitudinal axis 20 of the crane boom 12. For the telescoping of the boom 12, the latter has a telescoping device, formed in the present exemplary embodiment by a hydraulically operated telescoping cylinder ("telescope cylinder 22" for short).

The telescope cylinder 22 is arrested with its piston rod 24 in the base region of the main segment 16. The telescope cylinder 22 also bears a locking device 30 arranged at the rod-side end of its cylinder 28. Said locking device serves to grip one of the boom extension segments 18 during the telescoping of the boom 12 and to lock, i.e., arrest, said boom extension segment 18, in its target position, to the next outer boom extension segment 18 or optionally to the main segment 16.

Figure 2:
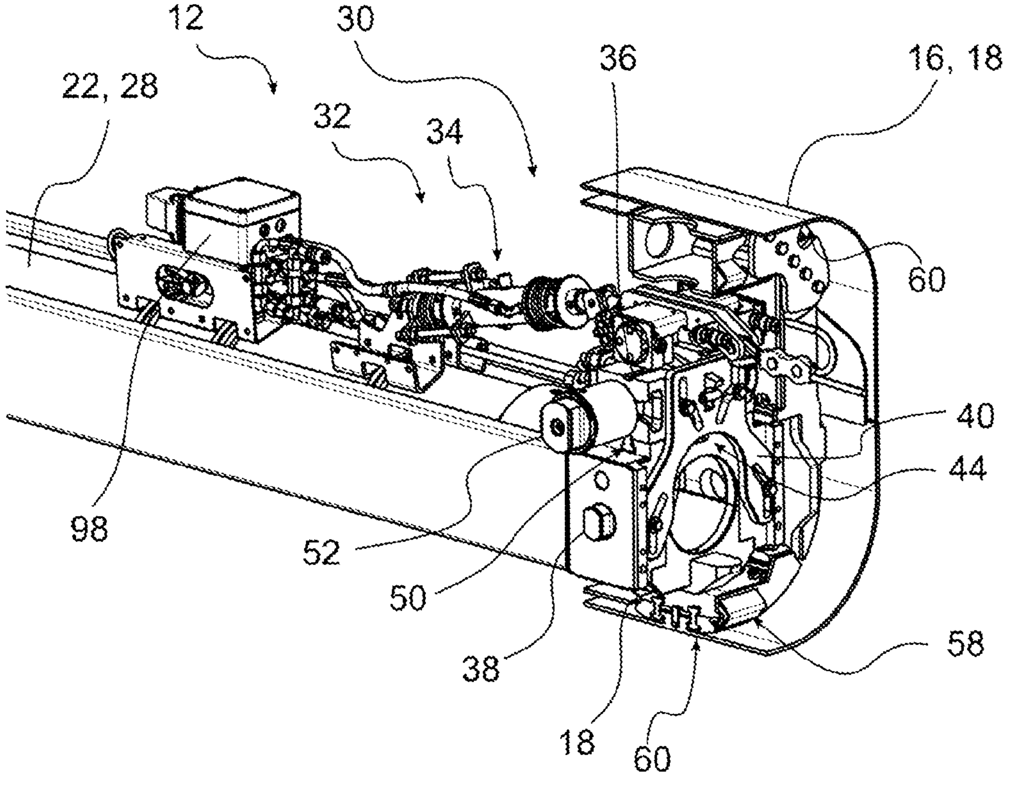
FIG. 2 is a perspective partial sectional illustration of the telescopic boom with a part of the telescoping device and a locking device.

As is apparent from FIG. 2, the locking device 30 has a (hydraulic) actuator 32 which, in the present exemplary embodiment, comprises a double-action hydraulic cylinder, specifically a double chamber cylinder in the form of a modified plunger cylinder 34 (also referred to as "plunger piston cylinder"). In addition, the locking device 30 has two diametrically opposite drivers 36, a movement axis 35 of which is oriented perpendicularly to the longitudinal axis 20, and two identically arranged driver bolts 38 (also see FIGS. 4 and 6; for the sake of clarity, only the left driver bolt in the drawing is ever labeled). For the transmission of the actuating force generated by the actuator 32 to the drivers 36 and the driver bolts 38 and therefore for the adjustment thereof, the locking device 30 also has a slotted actuating link 40. The latter has its movement plane oriented radially with respect to the longitudinal axis 20 (which corresponds to a telescoping direction of the boom 12). Specifically, the direction of movement of the slotted actuating link 40 runs in a tilting plane (i.e., from the bottom upward and vice versa in FIGS. 5 and 6) of the boom 12.

Figure 3:
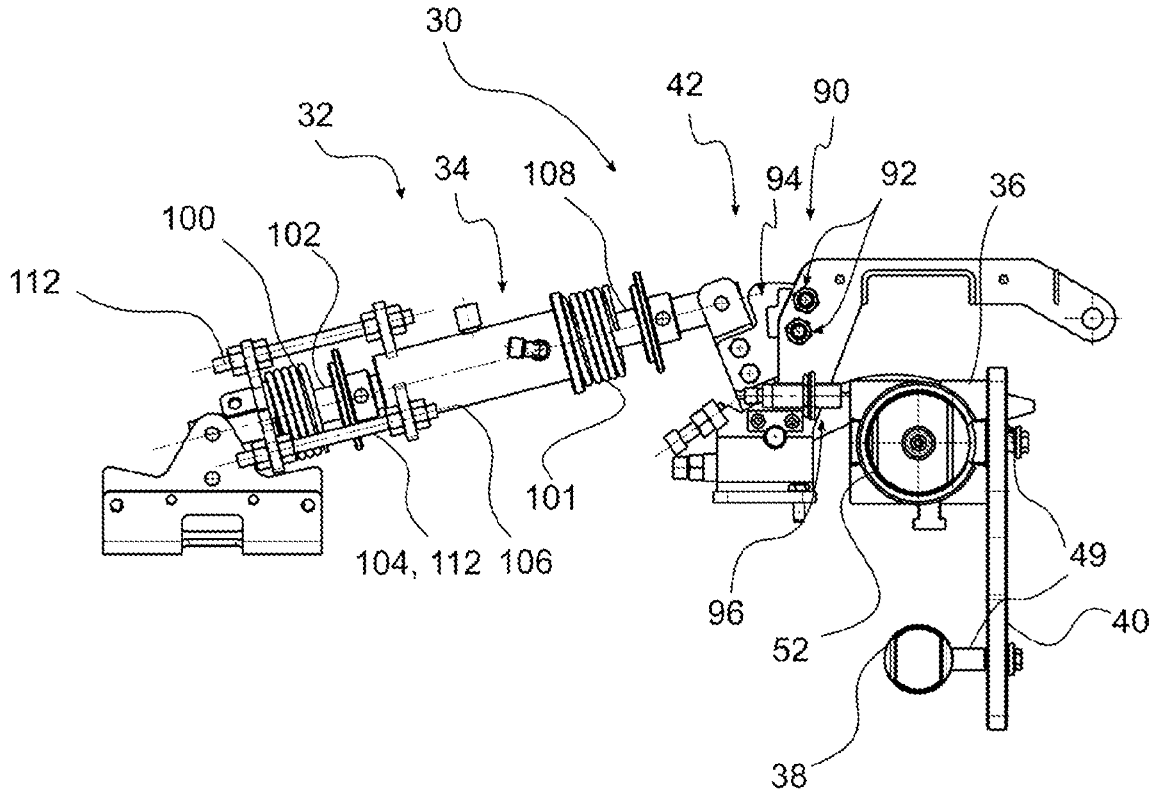
FIG. 3 is a schematic side view of the locking device separately.

In addition to the plunger cylinder 34, the actuator 32 has lever kinematics 42 serving to deflect the rectilinear movement generated by the plunger cylinder 34 to the slotted actuating link 40 by means of rotation (see FIG. 3).

The slotted actuating link 40 is formed by a roughly I-shaped or omega-shaped plate in order to keep a recess 44 for the plunger rod 24 free. In each case a first slotted link groove 46 for the respective driver 36 and in each case a second slotted link groove 48 for the respective driver bolt 38 are introduced into said plate. Consequently, the slotted actuating link 40 has two first and two second slotted link grooves 46 and 48, respectively, in each case. The drivers 36 and the driver bolts 38 are coupled in their respective slotted link groove 46 and 48, respectively, by means of a respective slotted link rod 49 for adjustment radially with respect to the longitudinal axis 20, specifically in each case in the direction of the associated longitudinal side of the boom 12. In addition, the drivers 36 and driver bolts 38 are guided along their respective movement axis 35 in sliding rails 50 or sliding sleeves (not illustrated).

The driver bolts 38 are configured and provided so as, during a telescoping movement, to couple the telescope cylinder 22 to the boom extension segment 18 to be adjusted. The driver bolts 38 are therefore assigned to the locking device 30. The drivers 36 serve to adjust a respective locking bolt 52 under the action of the actuating force in order to lock (or: "bolt") a boom extension segment 18 to the next outer boom extension segment 18 or to the main segment 16. Since the boom extension segments 18, as is known, also need to remain in their telescoped position after the telescoping movement, the locking bolts 52 are assigned to the boom extension segments 18. In other words, each boom extension segment 18 has a pair of locking bolts 52.

The drivers 36 and also the slotted actuating link 40 are configured in such a manner that the driver 36 can be coupled reversibly to the respective locking bolt 52. For this purpose, the respective driver 36 is designed in the manner of a claw. Specifically, the respective driver 36 has a T groove 54. The respective locking bolt 52 has, at its inner end, a T head 56 corresponding to the T groove 54 (see FIGS. 4 and 6). For the telescoping of a boom extension segment 18, first of all the telescope cylinder 22 is adjusted in such a manner that the locking device 30 is arranged in the "base region" of the corresponding boom extension segment 18. The boom extension segment 18 has a portion there that is also referred to as "bearing bracket 58" Sliding elements 60, inter alia, are arranged on the outer side of said bearing bracket 58 and slide on the inner side of the next outer boom extension segment 18 or of the main segment 16. In addition, the bearing bracket 58 has bolting eyes (not illustrated) for receiving the driver cylinders 38, and also has the locking bolts 52, which are guided in guide sleeves 62 (see FIGS. 4 and 5; only illustrated on the left side in FIG. 5).

If the telescope cylinder 22 "moves" with the locking device 30 into the region of the bearing bracket 58, the drivers 36 slide with the T grooves 54 over the T heads 56 of the locking bolts 52 and therefore grip the latter. In this state, the locking device 30 can adjust the locking bolts 52, i.e., can release (also: "pull") them or push them outward along the movement axis 35 for the purpose of locking the respective boom extension segment 18. The locking bolts 52 are arranged on the bearing bracket 58 in such a manner that they are pressed under the action of an actuating spring, not illustrated specifically, into a locking position 64 in which they protrude on the outer side over the bearing bracket 58 (see FIG. 6) and therefore can couple to a corresponding bolting eye (not illustrated) of the next outer boom extension segment 18 or of the main segment 16.

Figure 4:
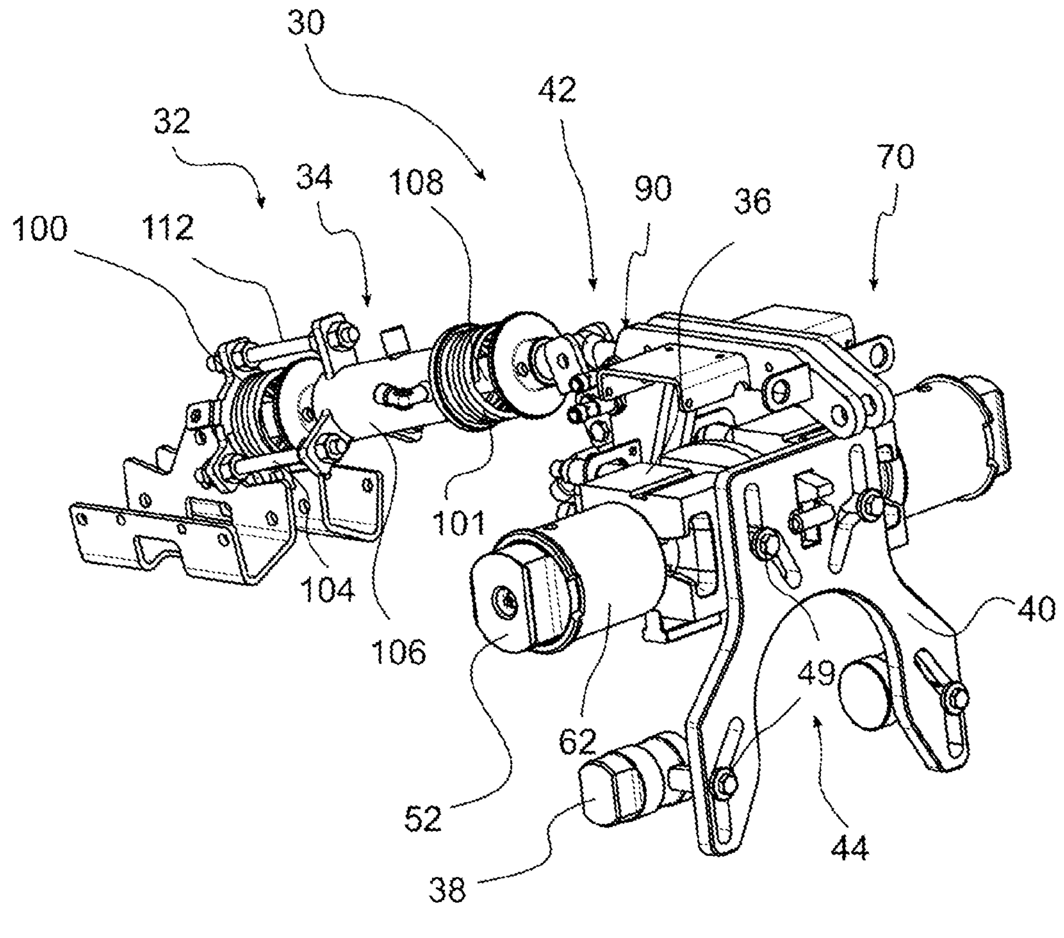
FIG. 4 is a perspective view of the locking device separately.
Figure 5:
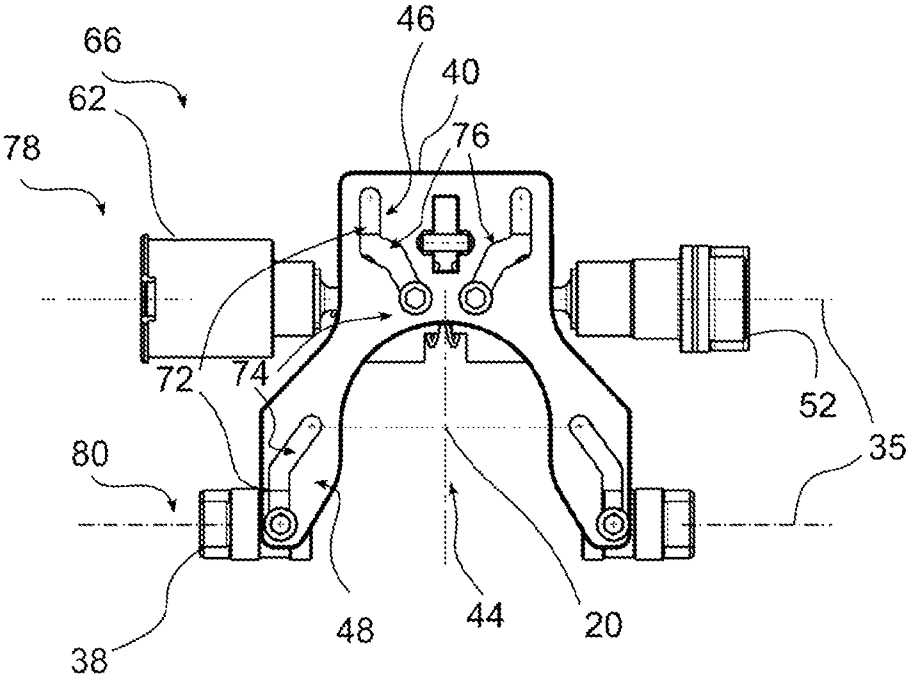
FIGS. 5 and 6 are schematic frontal views showing the locking device in different states.
Figure 6:
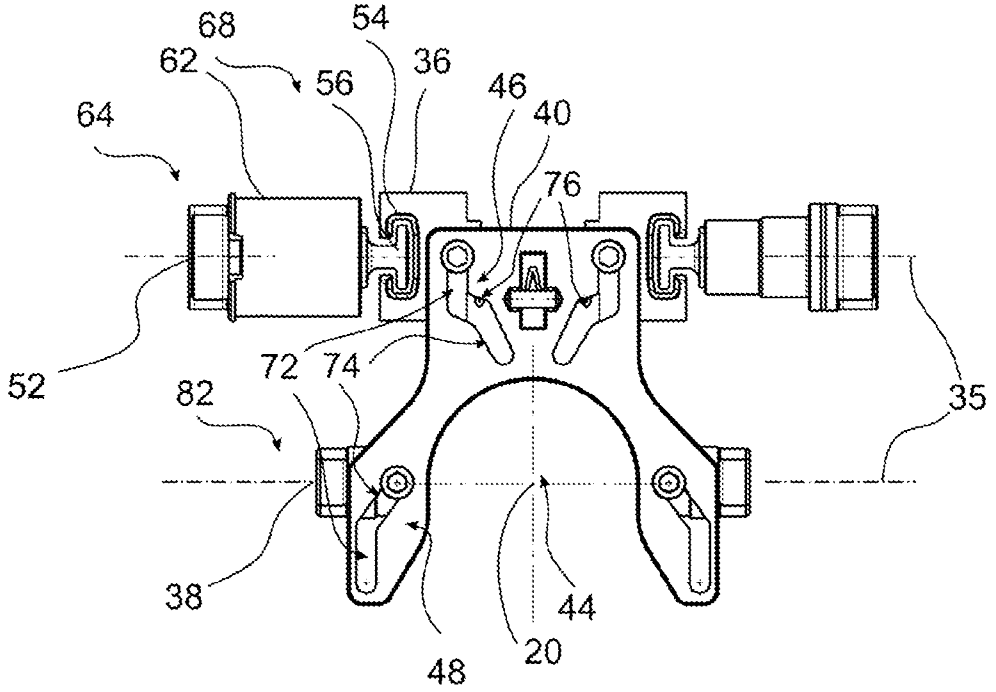

The slotted actuating link 40 is, as is apparent from FIGS. 4 to 6, adjustable between three positions. An upwardly pulled end position, also referred to as tele-position 66, or telescoped position 66, is illustrated in FIG. 5. A downwardly pushed end position, also referred to as securing position 68, is illustrated in FIG. 6. A neutral position 70 arranged between the tele-position 66 and the securing position 68 is revealed in FIG. 4.

The second slotted link grooves 48 have two rectilinear curved portions which are at an angle to one another, and therefore have a single angle. The first slotted link grooves 46 have three rectilinear curved portions which are angled in relation to one another, and therefore have a double angle. The respective end-side curved portions of the slotted link grooves 46 and 48 are referred to as securing portion 72 and retraction portion 74. The third "middle" curved portion of the first slotted link groove 46 is referred to as neutral portion 76. The securing portions 72 are oriented parallel to the direction of movement of the slotted actuating link 40, whereas the retraction portions 74 are positioned facing obliquely inward counter to the push-out direction of the drivers 36 and of the driver bolts 38. As is apparent from the figures, the securing portions 72 and the retraction portions 74 of the first and second slotted link grooves 46 and 48 are oriented in an opposed manner with respect to the direction of movement of the slotted actuating link 40.

As a result, a diametrically opposed movement or adjustment of the driver bolts and of the locking bolts 38 and 52, respectively, takes place. In the tele-position 66, the locking bolts 52 are retracted into a release position 78 in which they do not couple to the outer boom extension segment 18 or main segment 16, i.e., the adjustment of the inner boom extension segment 18 is enabled. By contrast, the driver bolts 38 are pushed out into what is referred to as a carry-along position 80, in which they are coupled to the bearing bracket 58.

In the securing position 68 of the slotted actuating link 40 (see FIG. 6), the locking bolts 52, by contrast, are arranged in their locking position 64, whereas the driver bolts 38 are retracted into an empty running position 82. As a result, the telescope cylinder 22 can be moved without carrying along a boom extension segment 18, but with the boom extension segments 18 being secured because of the pushed-out locking bolts 52 (so-called "empty running").

While the driver 36 moves inward or outward along the associated retraction portion 74, the driver bolt 38 remains in its locked position, i.e., the carry-along position 80 (the same also applies conversely), since the securing portion 72 is oriented parallel to the direction of movement of the slotted actuating link 40.

In the neutral position 70, the slotted link rods 49 of the drivers 36 are arranged in the region of the neutral portion 76. Said neutral portion is positioned more shallowly, i.e., at a smaller angle than the retraction portion 74 counter to the push-out direction, i.e., counter to the movement axis 35. This results in a smaller amount of friction when the locking bolt 52 is adjusted manually from the outside in the direction of its release position 78. The neutral portion 76 therefore permits emergency unlocking of the locking bolts 52. In addition, because of the position and the width of the first slotted link groove 46, the slotted link rod 49 has a comparatively greater amount of play along the movement axis 35 of the driver 36 in the region of the neutral portion 76. As a result, tolerance compensation in the region of the bearing bracket 58 and also the manual pushing in of the locking bolt 52 are simplified. A position of the locking bolts 52 during an emergency unlocking is illustrated in FIG. 8.

In order to be able to detect the position of the slotted actuating link 40, the locking device 30 has a position sensor 90. The latter is arranged in the region of the lever kinematics 42 and configured for detecting a rotational position. For this purpose, the position sensor 90 has two proximity switches 92 and an encoding disk 94 made from sheet metal with apertures as coding fields. By means of the proximity switches 92, the position of the encoding disk 94 is therefore identified from whether a coding field or a sheet metal wall lies opposite the applicable proximity switch 92. This design of the position sensor 90 is, as is known, robust against soiling by lubricant or hydraulic agent and—in particular because of the large elements selected—also against vibration.

In order additionally also to be able to check the actual position of the driver 36, the latter is also assigned a proximity switch 96. The latter is used to detect whether the driver 36 and therefore the locking bolt 52 are arranged in the locking position 64 and therefore the boom extension segment 18 is secured. This also permits a conclusion to be drawn as to whether the applicable boom extension segment 18 is arranged in its telescopic position as intended. This is because, during the telescoping of the boom extension segment 18, a control device 98 activates the locking device 30 in such a manner that the slotted actuating link 40, on moving into the bolting region of the outer boom extension segment 18 or of the main segment 16, is arranged in the neutral position 70. As a result, the drivers 36 and the locking bolts 52 can already bear against the inner side of the outer bolting region because of the play in the neutral portion 76 and because of the spring loading outward. The locking bolt 52 can therefore "feel" its associated bolting eye when the latter is "passed over."

Figure 7:
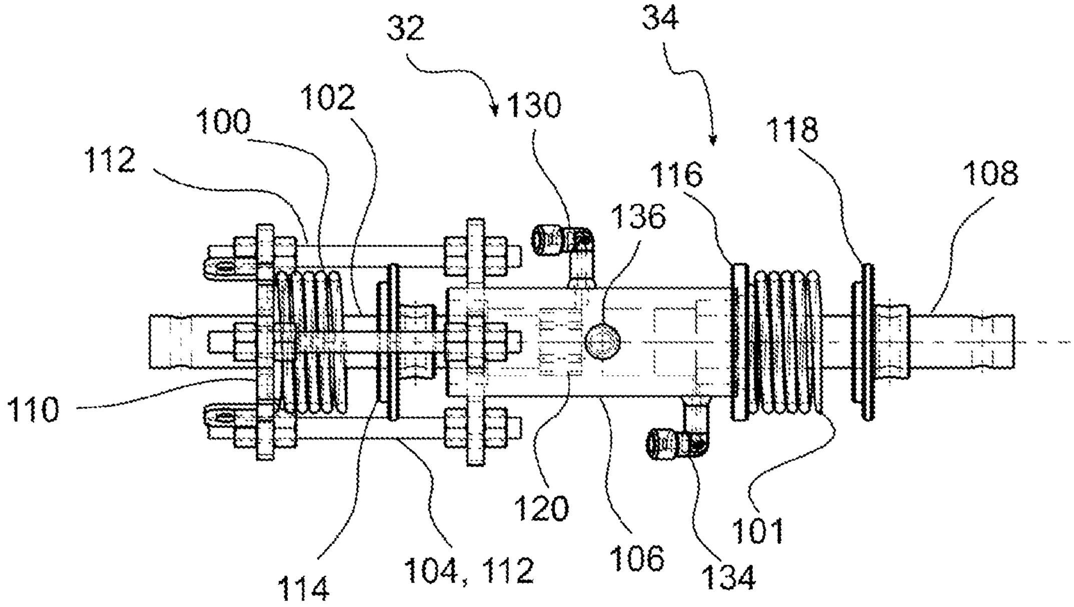
FIG. 7 is a schematic side view of a hydraulic cylinder of an actuator of the locking device.
Figure 8:
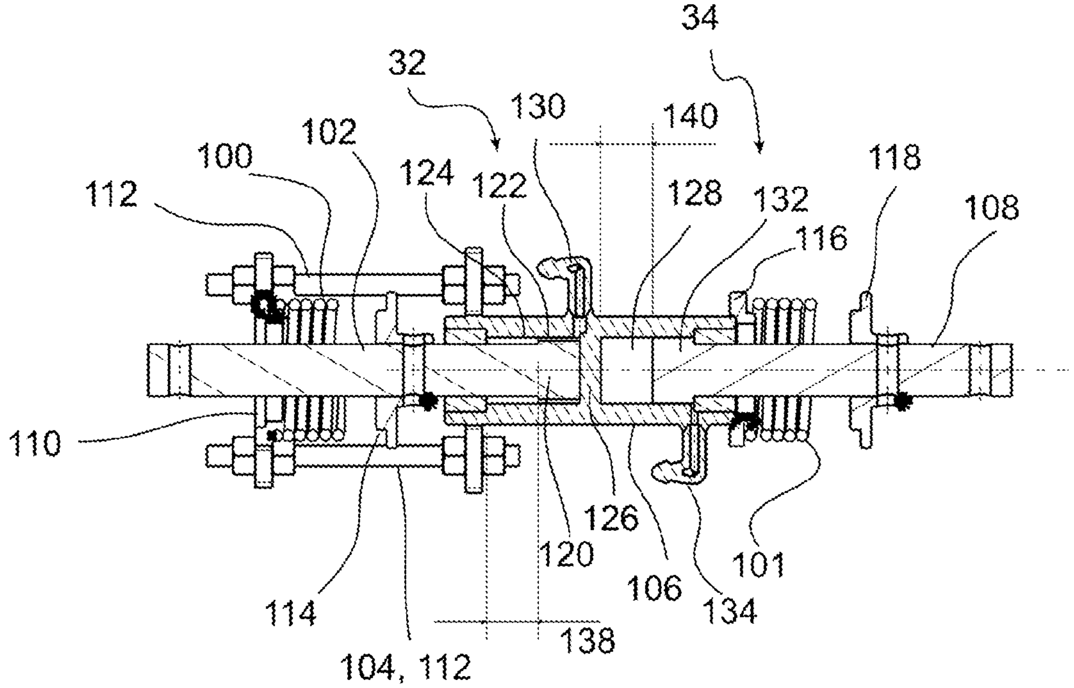
FIG. 8 is a longitudinal section of the hydraulic cylinder of the actuator of the locking device.

The plunger cylinder 34, as can be seen in FIGS. 3, 7 and 8, is spring-loaded by means of a first restoring spring 100 and a second restoring spring 101 in such a manner that, in the unpressurized state, it is returned to a main position and, in the process, puts the slotted actuating link 40 into its neutral position 70. For this purpose, the restoring spring 101 is coupled to a first piston rod 102 and a "spring cage 104" such that the first piston rod 102 is pushed back into the cylinder 106. The other, second restoring spring 101 is arranged between the cylinder 106 and the second piston rod 108 in such a manner that, in the unpressurized situation, said piston rod 108 is pulled out of the cylinder 106 (into its associated main position).

The spring cage 104 has a spring plate 110 and a linkage consisting of a plurality of supporting columns 112, here specifically three supporting columns, by means of which the spring plate 110 is positioned in relation to the cylinder 106. The first restoring spring 100 is arranged, specifically braced, between the spring plate 110 and a further spring plate 114, which is fastened to the first piston rod 102.

The supporting columns 112 are formed by threaded rods which permit a length setting for the spring cage 104, specifically an adjustment of the spring plate 110 in relation to the cylinder 106 and therefore setting of the pretensioning of the first restoring spring 100.

The second restoring spring 101 is arranged, specifically braced, between a cylinder-side spring plate 116, i.e., a spring plate connected to the cylinder 106, and a further spring plate 118 fastened to the second piston rod 108.

The first piston rod 102 bears a plunger piston 120 (giving its name to the plunger cylinder 34) (also see FIG. 8) which has longitudinal grooves 122 such that there is a fluidic connection between front piston end surface and rear-side piston ring surface. The plunger piston 120 is arranged in a first cylinder chamber 124 of the cylinder 106, which cylinder chamber is separated from a second cylinder chamber 128 by a partition 126. Independently of where a first hydraulic inlet 130 leads into the first cylinder chamber 124, when the first cylinder chamber 124 is pressurized, the plunger piston 120 is always extended counter to the first restoring spring 100.

A "normal", in particular substantially circular-cylindrical, piston 132, which is attached to the second piston rod 108, is guided in the second cylinder chamber 128. In this case, a second hydraulic inlet 134 assigned to the second cylinder chamber 128 is arranged on the outer side, i.e., on that side of the piston 132 which faces the second piston rod 108. As a result, the piston 132 is pushed under pressure into the cylinder 106. In order to avoid counterpressure by a compressed air cushion in this case, a venting valve 136 is connected on the inner side, specifically in the region of the partition 126, to the second cylinder chamber 128.

In the state without hydraulic pressure, the plunger piston 120 and the piston 132, because of the two restoring springs, take up the positions illustrated in FIGS. 7 and 8 such that the plunger cylinder 34 has the above-mentioned neutral position.

In order now to put the slotted actuating link 40 into its securing position 68, i.e., to push the locking bolts 52 outward into their locking position 64 or to hold them therein, the first cylinder chamber 124 is charged with hydraulic pressure. As a result, the plunger piston 120 is displaced (specifically extended) by its associated actuating stroke 138. Via the lever kinematics 42, this rectilinear actuating movement is deflected and the slotted actuating link 40—in order to remain in the image according to FIGS. 1 to 6—is lowered, i.e., displaced downward. The second cylinder chamber 128 remains unpressurized here. The slotted link pins 49 of the drivers 36 slide along the securing portions 72 of the slotted link grooves in the process.

In order, by contrast, to put the slotted actuating link 40 into its tele-position 66, first of all the first cylinder chamber 124 is switched to an unpressurized state and the second cylinder chamber 128 is placed under pressure. As a result, the plunger piston 120 is "retracted" and the piston 132 extended by its actuating stroke 140. This actuating movement is in turn transmitted via the lever kinematics 42 to the slotted actuating link 40 and the latter is raised. The drivers 36 are thereby retracted; the locking bolts 52 are too and are therefore "released" or "unbolted". By contrast, the driver bolts 38 are bolted to the next outer boom extension segment 18 or to the main segment 16, i.e., are extended.

The control device 98 is therefore configured to charge the two cylinder chambers 124 and 128 with hydraulic pressure basically independently of one another. Preferably, however, the one cylinder chamber 124 or 128 is switched to an unpressurized state together with the other cylinder chamber 128 or 124 being pressurized.

The subject matter of the invention is not restricted to the above-described exemplary embodiment. Rather, further embodiments of the invention can be derived by a person skilled in the art from the above description.

The following is a summary list of reference numerals and the corresponding structure used in the above description of the invention:

1 Mobile crane
2 Undercarriage
4 Wheel
6 Cockpit
8 Superstructure
10 Vertical axis
12 Boom
14 Rocker axis
16 Main segment
18 Boom extension segment
20 Longitudinal axis
22 Telescope cylinder
24 Piston rod
28 Cylinder
30 Locking device
32 Actuator
34 Plunger cylinder
35 Movement axis
36 Driver
38 Driver bolt
40 Slotted actuating link
42 Lever kinematics
44 Recess
46 Slotted link groove
48 Slotted link groove
49 Slotted link rod
50 Sliding rail
52 Locking bolt
54 T groove
56 T head
58 Bearing bolt
60 Sliding element
62 Guide sleeve
64 Locking position
66 Tele-position
68 Securing position
70 Neutral position
72 Securing portion
74 Retraction portion
76 Neutral portion
78 Release position
80 Carry-along position
82 Empty running position
90 Position sensor
92 Proximity switch
94 Encoding disk
96 Proximity switch
100 Restoring spring
101 Restoring spring
102 Piston rod
104 Spring cage
106 Cylinder
108 Piston rod
110 Spring plate
112 Supporting column
114 Spring plate
116 Spring plate
118 Spring plate
120 Plunger piston
122 Longitudinal groove
124 Cylinder chamber
130 Hydraulic inlet
132 Piston
134 Hydraulic inlet
136 Venting valve
138 Actuating stroke
140 Actuating stroke

The invention claimed is:

1. A hydraulic actuator for a mobile crane, the hydraulic actuator comprising:

a double chamber cylinder formed with a first cylinder chamber and a second cylinder chamber oriented opposite said first cylinder chamber;

a first piston rod associated with said first cylinder chamber and a second piston rod associated with said second cylinder chamber;

a first restoring spring configured for restoring said first piston rod to a main position thereof wherein said first piston rod is in a pushed-in position in said first cylinder chamber; and a second restoring spring configured for restoring said second piston rod into a main position thereof wherein said second piston rod is in an extended position.

2. The hydraulic actuator according to claim 1, configured for actuating a locking device of a telescoping device.

3. The hydraulic actuator according to claim 1, wherein said first restoring spring is disposed in a spring cage which is rigidly mounted to said double chamber cylinder, and wherein said first restoring spring is supported in said spring cage against a spring plate arranged on a push-in side of said first piston rod.

4. The hydraulic actuator according to claim 1, wherein said double chamber cylinder and said first and second piston rods are configured to cause said first piston rod to be moved by hydraulic pressure in an extension direction and to cause said second piston rod to be moved by hydraulic pressure in a push-in direction.

5. The hydraulic actuator according to claim 1, further comprising a plunger piston disposed on said first piston rod.

6. The hydraulic actuator according to claim 1, further comprising a venting valve connected to said second cylinder chamber on a piston inner side.

7. The hydraulic actuator according to claim 1, wherein said first and second cylinder chambers are chargeable with hydraulic pressure independently of one other.

8. A locking device for a telescopic boom, comprising:

a hydraulic actuator for generating an actuating force, said hydraulic actuator including:

a double chamber cylinder formed with a first cylinder chamber and a second cylinder chamber oriented opposite said first cylinder chamber;

a first piston rod associated with said first cylinder chamber and a second piston rod associated with said second cylinder chamber;

a first restoring spring configured for restoring said first piston rod to a main position thereof wherein said first piston rod is in a pushed-in position in said first cylinder chamber; and a second restoring spring configured for restoring said second piston rod into a main position thereof wherein said second piston rod is in an extended position;

at least one driver configured to be reversibly coupled, during a telescoping movement of the telescopic boom, to a locking bolt that is secured at a boom extension segment of the telescopic boom, and to be moved by the actuating force for adjusting the locking bolt between a locking position and a release position;

at least one driver bolt configured to be reversibly moved by the actuating force between a carry-along position, gripping an inner boom extension segment, and an empty running position in which no boom extension segment is gripped; and a slotted actuating link configured for a joint movement of the locking bolt and said driver bolt, said slotted actuating link, in an installation state as intended, having a movement plane oriented perpendicular to a telescoping direction of the telescopic boom.

9. The locking device according to claim 8, configured for a telescopic boom of a mobile crane.

10. A telescopic boom for a mobile crane, comprising: a plurality of boom segments mounted displaceably inside one another, a telescoping device, and the locking device according to claim 8.

11. A mobile crane, comprising a telescopic boom according to claim 10.

12. A method, comprising:

providing a telescopic boom according to claim 10 and operating the telescopic boom by selectively:

locking an inner boom segment of the boom segments to a next outer boom segment by charging the first cylinder chamber with hydraulic pressure and switching the second cylinder chamber to an unpressurized state, wherein the driver bolt is decoupled from the inner boom segment; and unlocking the inner boom segment from the next outer boom segment by switching the first cylinder chamber to an unpressurized state and charging the second cylinder chamber with hydraulic pressure, wherein the locking bolt is decoupled from the next outer boom segment and the driver bolt is coupled to the inner boom segment.

* * * * *